J. LEDWINKA.
ELECTRODE LOCKING DEVICE FOR ELECTRIC WELDING MACHINES.
APPLICATION FILED MAY 19, 1919.

1,326,601. Patented Dec. 30, 1919.

Inventor
Joseph Ledwinka
by his atty Samuel E. Darby

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRODE-LOCKING DEVICE FOR ELECTRIC WELDING-MACHINES.

1,326,601.   Specification of Letters Patent.   Patented Dec. 30, 1919.

Application filed May 19, 1919. Serial No. 298,037.

*To all whom it may concern:*

Be it known that I, JOSEPH LEDWINKA, a citizen of the United States, residing at Philadelphia, in the county of Philadelphia, State of Pennsylvania, have made a certain new and useful Invention in Electrode-Locking Devices for Electric Welding-Machines, of which the following is a specification.

This invention relates to locking devices for the electrodes employed in electric welding machines.

The object of the invention is to provide a locking device for the electrodes of welding machines which is simple in construction and efficient in operation.

A further object of the invention is to provide a locking means of the nature and for the purpose mentioned which not only efficiently clamps and secures the electrode but which permits the ready and easy removal or adjustment of the electrode.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

In the drawing:—

The same part is designated by the same reference numeral wherever it occurs throughout the several views.

Figure 1:
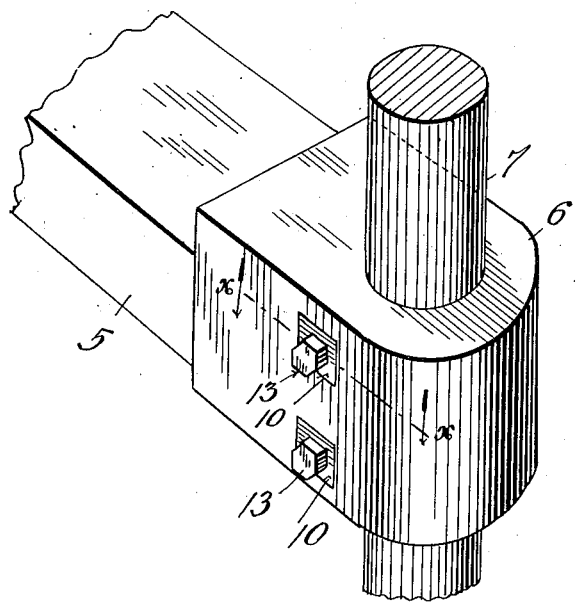
Figure 1 is a view in perspective showing a portion of the electrode carrier arm of a welding machine and the application thereto of clamp mechanism for the electrode in accordance with my invention.
Figure 4:
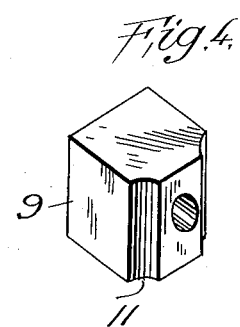
Fig. 4 is a detached detail view in perspective of one of the clamp blocks.
Figure 2:
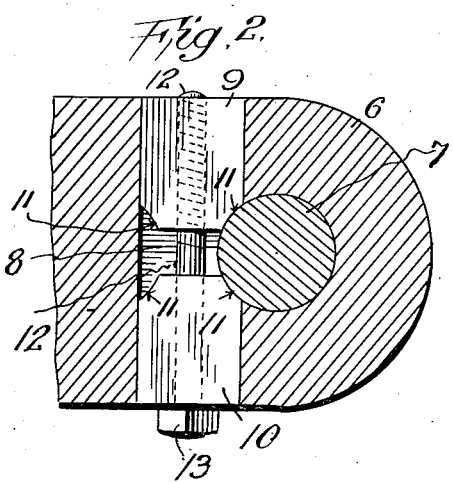
Fig. 2 is a view in section on the line $x$, $x$, Fig. 1, looking in the direction of the arrows.
Figure 3:
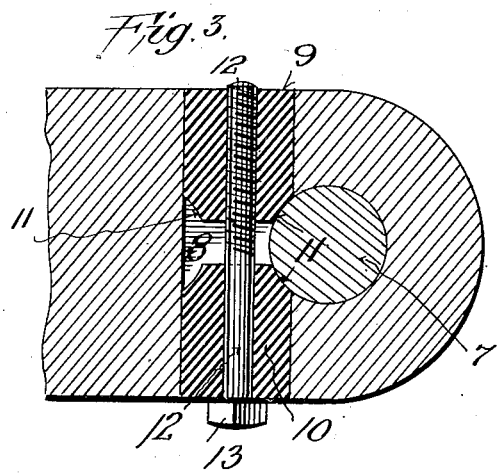
Fig. 3 is a view similar to Fig. 1 showing the clamp locks in section.

Reference numeral 5 designates the electrode supporting or carrying arm of an electric welding machine, 6 the head carried by said arm, and which receives and supports the electrode 7. In the particular form shown to illustrate the principles of my invention the head 6 is formed with an opening vertically therethrough in which the electrode 7 is received. I do not desire, however, to be restricted or limited in the broadest scope of my invention to this particular disposition of the electrode in the head or holder.

In carrying out my invention, and to provide simple and efficient means for clamping and locking the electrode 7 in the holder 6, I provide a holder 6 with a passage 8 transversely therethrough, and which passage partially intersects the opening or seating in the holder for the electrode 7. The transverse passage 8 through the holder is preferably rectangular in cross section, although I do not desire to be limited or restricted to a rectangular passage, since it is obvious that any polygonal shape of passage will well answer the purpose. Received within the transverse passage 8 are the oppositely disposed clamp blocks 9, 10, which are shaped in transverse section to conform to the cross sectional area of the passage 8. These clamp blocks on their opposing end surfaces are formed with beveled or curved edge portions 11 shaped to conform to the contour of the exterior surface of the electrode 7 and to engage the electrode and not only clamp the same between the two blocks when said blocks are brought toward each other but also operating to force the electrode generally into its seating in the holder 6 to thereby effectively clamp and hold the electrode in position. The clamp blocks 9, 10, are carried upon a bolt 12 which is threaded at one end to engage in interior threads formed through the axial bore of one of the blocks, as for example, block 9. The other end of the bolt is free of threads and this portion of the bolt is received loosely through the unthreaded axial bore of the other block, as for example, block 10, the head 13 of the bolt forming a shoulder against which the loosely sleeved clamp block may bear.

With the electrode 7 inserted in its seat in the holder 6 and the clamp blocks inserted in the transverse passage 8 through the holder 6, by simply turning the screw bolt 12, the blocks 9, 10, being held by the shape of the passage 8 against rotation, it will be seen that the block which is engaged by the threaded portion of the bolt will be drawn toward the loosely mounted block in the manner of a traveling nut until the traveling block engages the electrode and its travel thereby arrested. Thereafter by continuing to turn the screw bolt the screw bolt will move longitudinally through the threaded block causing the head 13 thereof to engage the loosely mounted block and force the same into bearing contact against the electrode. Thus the opposed clamp faces of the blocks are drawn toward each other and into engagement with the electrode, thereby clamping the electrode therebetween and forcing the same tightly against its seat in the holder 6. When it is desired to remove or to adjust the position of the electrode it is only necessary to loosen up the screw bolt 12 which will cause the blocks 9, 10, to release their engagement with the electrode, thereby permitting the electrode to be removed or to be adjusted as may be desired.

The construction shown and described is exceedingly simple, economical to manufacture, and has in practice been found to be effective for the purposes set forth.

In Fig. 1 I have shown two sets of clamp devices, that is, two bolts and associated clamp blocks each occupying a separate transverse passage in the electrode holder. Obviously my invention is not to be limited in this respect as a single screw bolt and assemblage of clamp blocks and a single transverse passage in the electrode holder might well answer the purpose.

It is to be understood that variations and changes in the details will readily occur to persons skilled in the art and still fall within the spirit and scope of my invention. I do not desire therefore to be limited or restricted in the broader scope of my invention to the exact details shown and described.

Having now set forth the object and nature of my invention, and a construction embodying the principles thereof, what I claim as new and useful and of my own invention, and desire to secure by Letters Patent is,—

1. In an electrode clamping device, a holder having a seat to receive the electrode and a transverse passage communicating with said seat, in combination with oppositely disposed clamp blocks in said passage, and means to adjust said clamp blocks toward and from each other to clamp or release the electrode.

2. In an electrode clamping device, a holder having a seat to receive the electrode and a transverse passage communicating with said seat, of oppositely disposed clamp blocks received in said passage, said passage and blocks being shaped to prevent axial rotation of the blocks, and means for moving said blocks toward and from each other to clamp or release the electrode.

3. The combination with an electrode holder having a seat to receive the electrode and a transverse passage through the holder communicating with said seat, of oppositely disposed clamp blocks arranged in said passage and having alined bores and a screw bolt received through said bores, said screw bolt having threaded engagement with one of said blocks, the other of said blocks being loose upon said screw bolt.

4. The combination with an electrode holder having a seat to receive the electrode and a transverse passage through the holder communicating with said seat, of oppositely disposed clamp blocks arranged in said passage and having alined bores and a screw bolt received through said bores, said screw bolt having threaded engagement with one of said blocks, the other of said blocks being loose upon said screw bolt, said blocks being held in said passage against rotative movement therein.

5. The combination with an electrode holder having a seat to receive an electrode and a transverse passage communicating with said electrode, of oppositely disposed clamp blocks arranged in said passage, a bolt extending longitudinally through said blocks, said screw bolt having threaded engagement with one of said blocks and loosely passing through the other of said blocks.

6. The combination with an electrode holder having a seat to receive an electrode and a transverse passage communicating with said seat, oppositely disposed clamp blocks arranged in said passage, said clamp blocks having engaging surfaces on their opposed faces to engage and clamp the electrode therebetween, and means for moving said clamp blocks toward and from each other.

7. The combination with an electrode holder having a seat to receive an electrode and a transverse passage communicating with said seat, oppositely disposed clamp blocks arranged in said passage, said clamp blocks having engaging surfaces on their opposed faces to engage and clamp the electrode therebetween, a screw bolt having theaded engagement with one of said blocks and passing loosely through the other of said blocks, said blocks being held against rotative movement within said passage.

In testimony whereof I have hereunto set my hand on this 7th day of May A. D., 1919.

JOSEPH LEDWINKA.